United States Patent [19]

Dovidauskas

[11] Patent Number: 4,930,967

[45] Date of Patent: Jun. 5, 1990

[54] BOAT TRAILER SUPPORTING DEVICE

[76] Inventor: John J. Dovidauskas, 430 Lafayette St., Linden, N.J. 07036

[21] Appl. No.: 381,195

[22] Filed: Jul. 18, 1989

[51] Int. Cl.⁵ .............................................. B65G 67/02
[52] U.S. Cl. ..................................... 414/373; 414/572
[58] Field of Search ............... 414/389, 401, 584, 572, 414/373, 337, 338

[56] References Cited

U.S. PATENT DOCUMENTS

| | | | |
|---|---|---|---|
| 1,495,339 | 5/1924 | Maber | 414/572 |
| 1,792,055 | 2/1931 | Young | 414/389 X |
| 2,720,324 | 10/1955 | Cosentino | 414/389 |
| 3,511,392 | 5/1970 | Blunden et al. | 414/373 |
| 3,618,796 | 11/1971 | Peisner | 414/401 X |
| 3,949,976 | 4/1976 | Cofer | 269/17 |
| 4,081,090 | 3/1978 | Hopkins | 414/373 |
| 4,177,978 | 12/1979 | Warsaw | 269/17 |
| 4,190,393 | 2/1980 | Londow | 525/373 X |
| 4,300,751 | 11/1981 | Delaney | 254/2 R |

Primary Examiner—David A. Bucci
Attorney, Agent, or Firm—Terry M. Gernstein

[57] ABSTRACT

A boat trailer supporting device permits the boat trailer to be moved and maneuvered by hand and includes two ramps and a dolly-like device having wheels thereon. The relative heights of the various elements are selected so that the boat trailer wheels will be supported off of the ground when the boat trailer axle is supported on the dolly-like device. The dolly-like device includes wheels that can be adjusted to adjust the heights of the various elements, and that device can include a further height adjusting system, such as a jackscrew.

4 Claims, 3 Drawing Sheets

FIG. 3
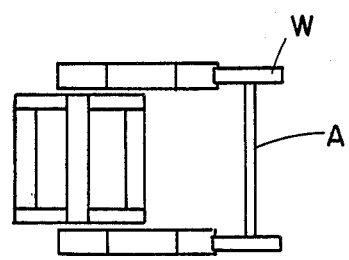
FIG. 4
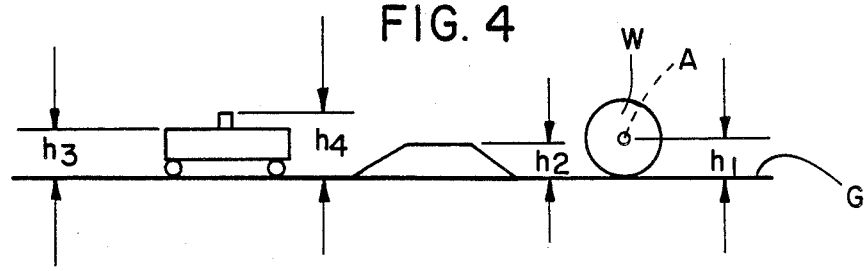
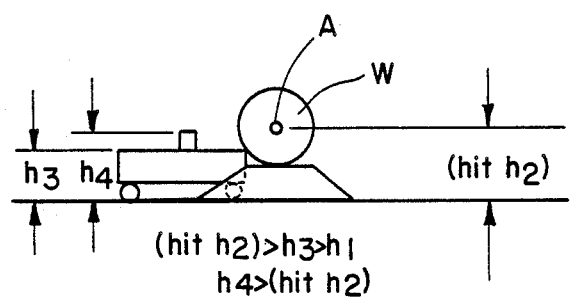
FIG. 5
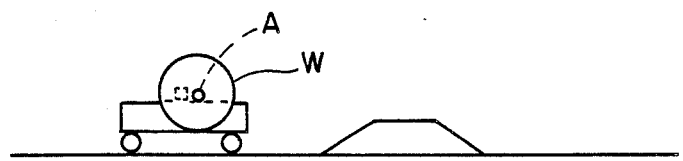
FIG. 6

BOAT TRAILER SUPPORTING DEVICE

TECHNICAL FIELD OF THE INVENTION

The present invention relates to the general art of support stands, and to the particular field of stands for supporting a marine vehicle.

BACKGROUND OF THE INVENTION

The sport of boating, and sports, such as fishing and water skiing which are related thereto, have all enjoyed a tremendous increase in popularity in recent years. More and more people are owning boats.

These boats are generally used often during a particular season of the year, and then only sporadically or not at all during other times of the year. Often, such boats must be serviced. While some boats are stored in slips at docks and/or marinas, such storage space can be quite expensive and can limit use of the boat.

Accordingly, many boat owners choose to store their boat at home. The boat should be stored inside during an off season, especially if the weather during such off season tends to be extremely harsh. However, many boat owners have only limited space available for boat storage purposes. Still further, when such space is available, it is often located in an out-of-the way spot.

Therefore, boat storage in a home garage presents several problems which may inhibit or influence a potential boat owner from purchasing a boat.

Accordingly, there is a need for a means for easing the storage of a boat in a home garage.

OBJECTS OF THE INVENTION

It is a main object of the present invention to provide a device for easing the storage of a boat in a home garage.

It is another object of the present invention to provide a device for easing the storage of a boat in a home garage by easing the maneuvering of such a boat.

It is another object of the present invention to provide a device for easing the servicing of a boat in a home garage.

SUMMARY OF THE INVENTION

These, and other, objects of the present invention are achieved by a support that includes two ramps on which the wheels of a boat-supporting vehicle are driven to elevate the axle of such vehicle, and a dolly-like element that supports the chassis of a support vehicle at an elevation that keeps the wheels thereof off of the ground.

In this manner, the boat can be easily maneuvered about by hand after the support element has been disconnected from a towing vehicle. The boat can thus be placed in the most convenient location in an easy manner. Heretofore, the boat had to be maneuvered into such position by means of the towing vehicle which is often difficult and awkward. Because of the difficulty of maneuvering the boat using a towing vehicle, many boat owners simply do not place their boats in the most convenient location.

The alternative forms of the device include leaf springs and lifting means for further easing the maneuvering of the boat.

BRIEF DESCRIPTION OF THE FIGURES

FIG. 3 is a top plan view of the device of the present invention in position adjacent to a wheel set of a boat supporting vehicle.

FIG. 4 is a side elevational view of the device of the present invention located adjacent to the wheel set of a boat supporting vehicle.

FIG. 5 is a side elevational view of the wheels of a boat-supporting vehicle located on top of the ramps of the present invention and located to be moved onto the dolly-like element of the invention.

FIG. 6 is a side elevational view of the wheels of the boat-supporting vehicle being supported on the dolly-like element of the present invention.

DETAILED DESCRIPTION OF THE PREFERRED EMBODIMENT OF THE INVENTION

Figure 1:
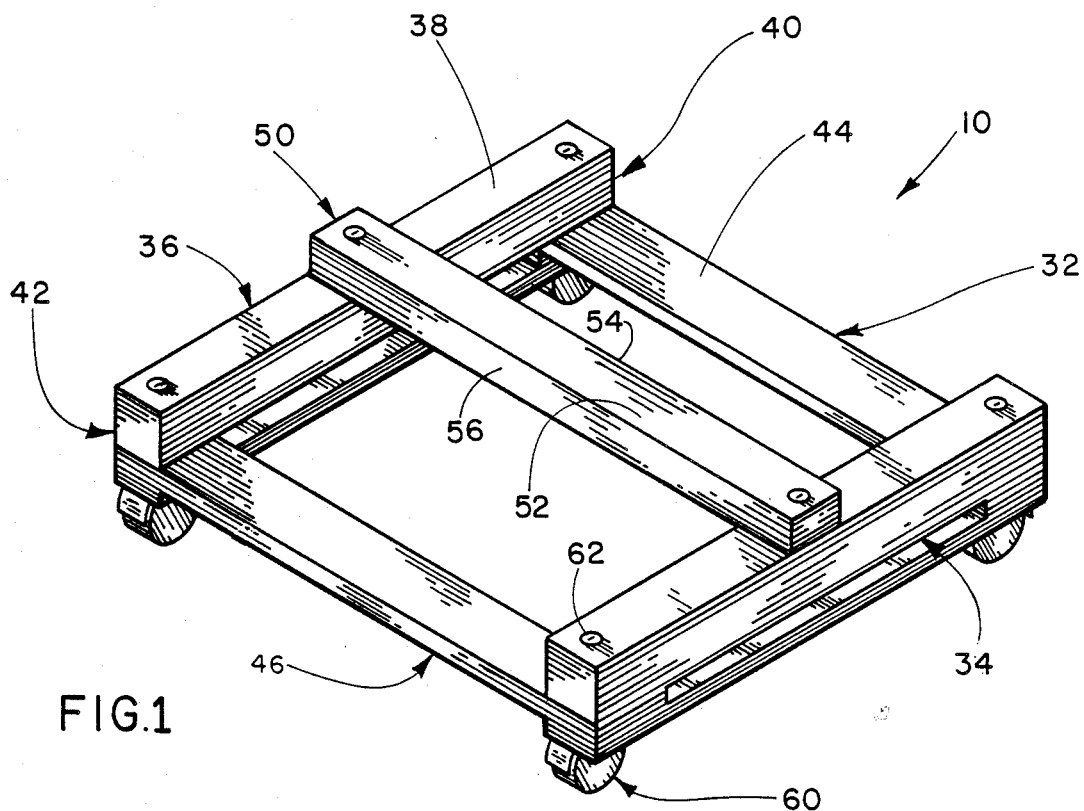
FIG. 1 is a perspective view of a movable dolly-like device included in the boat support means embodying the present invention.
Figure 2:
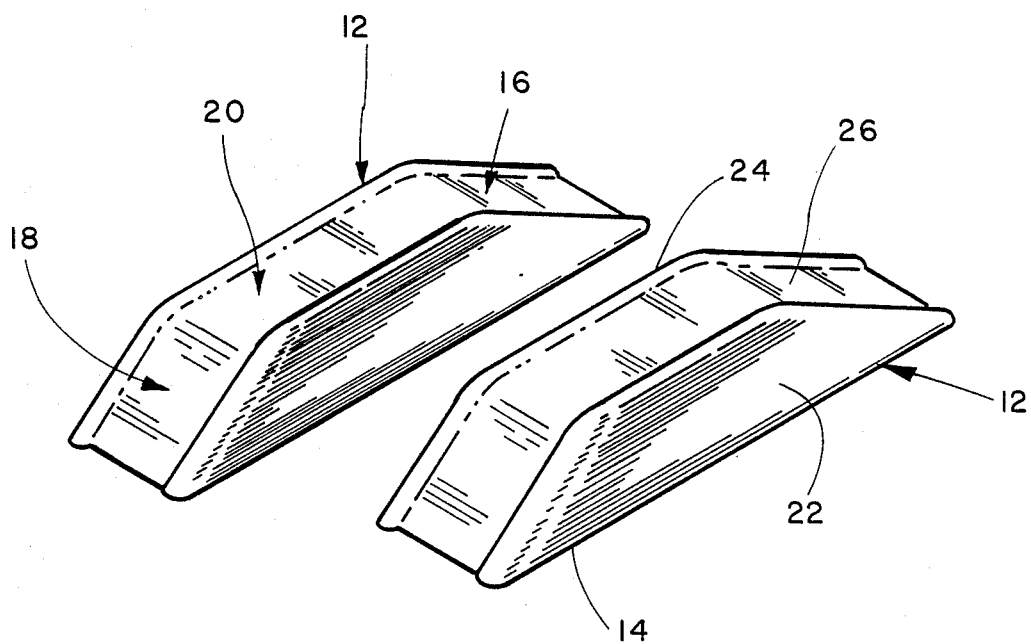
FIG. 2 is a perspective view of the ramps used in the device of the present invention.

Shown in FIGS. 1 and 2 is a device for moving and maneuvering a boat that is on a support vehicle, such as a boat trailer, that is adapted to be hitched to a towing vehicle. As is well known, such support vehicles include a support frame on which the boat rests and a chassis connected to such support frame. The chassis includes two ground-engaging wheels that are connected together and to the chassis by an axle. Such support elements are well known, and thus will not be further discussed herein. The boat is towed behind the towing vehicle on the support frame, and is maneuvered by maneuvering the towing vehicle. This can be a difficult and complicated undertaking, especially if the boat is to be placed in a small, tight, spot.

Accordingly, the present invention includes means to permit such maneuvering to be carried out by hand after the support frame has been disconnected from the towing vehicle. In this manner, the maneuvering can be carried out in a precise manner.

As shown in FIGS. 1 and 2, the device includes a dolly-like element 10 on which the boat-support vehicle will be supported, and two ramps 12 which serve as an elevating means for lifting the wheels of the boat trailer off of the ground.

Each of the ramps includes a bottom surface 14 which rests on the ground, a upwardly inclined entrance section 16, a downwardly inclined exit section 18 and a horizontal top section 20 connecting the sections 16 and 18. The ramps also include sides 22 and 24, with the width dimension of the ramps being defined by the spacing between the sides 22 and 24, and the height dimension being defined by the distance to any particular point on top surface 26 of the ramps from the ground on which the ramps are supported. Thus, the height of the top section is defined as the distance between the top surface of the top section and the ground when the ramp rests on the ground.

The ramp width is selected to permit the wheels of the trailer to be moved off of the ground as will be more fully discussed below.

The device further includes the dolly-like device 10 which supports the trailer vehicle via the axle and which includes a frame 32 having two beams 34 and 36, each of which includes a top surface 38 and each of which extends from a forward location 40 to an aft location 42 of the device 10. The device 10 further includes two cross frame elements 44 and 46 located at the forward position and the aft position of the device respectively, and connecting the beams together.

The device 10 further includes a trailer axle-engaging element 50 mounted on top of the beams between the forward position and the aft position of the device. The element 50 extends parallel to the cross frame elements, and includes a top surface 52, a forward side surfaces 54 and an aft side surface 56 which extend upwardly from the beam top surfaces 38 to the top surface 52. The top surface 52 has a height as measured between the ground and the top surface 52 that is selected according to the parameters and considerations that will be discussed below.

The device 10 further includes four caster-like wheels, such as wheel 60 connected to the beams by a pivot pin, such as pivot pin 62 to permit the wheels to rotate around the pivot pins in a plane that is horizontally oriented with respect to the ground. The wheels are mounted on axles (not shown) to rotate in the manner common to such wheels in a plane that is vertically oriented with respect to the ground, whereby the wheels can move in at least two planes.

Referring next to FIGS. 3-6, especially FIG. 5, it is seen that the heights of each element 10 and 12 and the portions thereof are selected so that the axle A of the trailer wheels W will be elevated above the height of the beam top surface 38 but below the height of the axle-engaging element top surface 52 when the wheels are located on the ramp top surface 20. By this positioning, the axle will engage the axle-engaging element forward side surface 54 when the trailer wheels begin to move down the ramp exit sections 18 thereby leaving the chassis supported on the device 10. Due to the relative heights of the various elements of the device, the trailer will be supported on the device 10 via the axle A with the wheels W held above the ground as indicated in FIG. 6. The trailer can then be detached from the towing vehicle, and the towing vehicle moved out of the way. The boat on the trailer can then be moved about using the dolly-like device 10. This movement can be effected by hand and the multi-planar movement of the wheels 60 permit the boat and the device to be easily moved and maneuvered from one place to another.

Thus, as shown in FIG. 5, the wheel axle A is located at a first height $h_1$ above the ground G, the ramp top surface 20 is located at a second height $h_2$ above the ground, the beam top surfaces 38 are located at a third height $h_3$ above the ground, and the axle-engaging top surface 52 is located at a fourth height $h_4$ above the ground G. These heights are selected so that the third height $h_3$ is greater than the first height $h_1$ so that the wheels W will be supported off of the ground G when the axle rests on the beam top surfaces 38 as shown in FIG. 6, yet the third height $h_3$ is less than the combined total of the first and second heights $h_1$ plus $h_2$ so that the trailer wheel can be moved into position to locate the axle above the beam top surface 38. Still further, the fourth height $h_4$ is greater than the combined total of the first and second heights $h_1$ plus $h_2$ whereby the axle A will engage the forward side surface 54 of the axle-engaging element 50 to prevent the trailer from moving off of the device 12, as is shown in FIG. 6.

Thus, the device of the present invention is used by locating the ramps behind the trailer wheels W and the device 10 so that the forward side surface 54 of the axle-engaging element 50 is located aft of the top sections 20 of the ramps as shown in FIG. 4. The towing vehicle is then backed up towards the ramps to move the wheels W onto the ramp entrance sections 26 and up those sections until the wheels rest on top of the top sections 20 as shown in FIG. 5. The towing vehicle is backed up to move the wheels down the ramp exit sections 18, and this causes the axle to move downwardly and rearwardly of the ramps and the device 10 until the axle engages the side surface 54 of the element 50. Further rearward movement of the towing vehicle will cause the device 10 to move rearwardly under the influence of the abutting contact between the axle and the element 50, and will cause the axle to be supported on top of the beam top surfaces 38 due to the lowering of the wheels W as they move along the exit sections 18. Eventually, the trailer will be supported by the device 10 as shown in FIG. 6.

Figure 7:
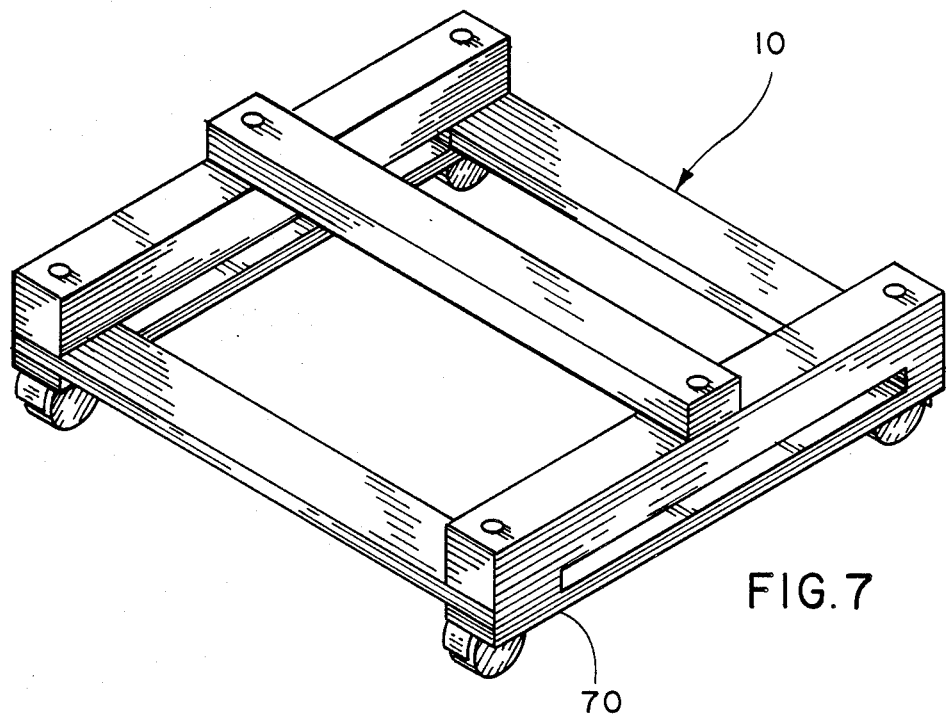
FIG. 7 is a perspective view of a second embodiment of the movable dolly-like device included in the boat support means embodying the present invention.

The dolly-like device of the present invention can include leaf springs in place of the beams 34 and 36, such as leaf spring 70 shown for device 10' in FIG. 7. Still further, the dolly-like device can include elevating means, such as the jackscrew-like device shown and discussed in U.S. Pat. No. 4,177,978, the disclosure of which is fully incorporated herein by reference. Hydraulic elements can also be included as lifting devices. Thus, the wheels 60 can be connected to the beams by jackscrew-like elements or by hydraulic elements so that the wheels 60 can be raised or lowered as necessary to adjust the height of the device to a suitable level.

Figure 8:
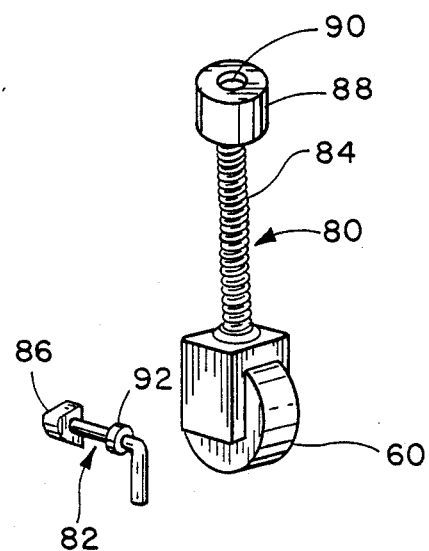
FIG. 8 is a perspective view of a lifting device used to adjust the relative heights of the elements of the various elements of the invention.

By way of example, a wheel 60' are shown in FIG. 8 in combination with a jackscrew element 80 connecting such wheel to the frame beam 34. The jackscrew 80 includes a wheelframe 81 and a handle 82 for rotatinng the screw to move the beam away or towards the wheel. This will permit leveling the device as well as changing the height thereof as required. The handle 82 is connected to the main screw 84 of the jackscrew by an element 86 that translates the rotation of the handle into movement that will rotate the main jackscrew. The main jackscrew is in a frame 88 mounted on the beam and moves into or out of that frame depending on the direction of rotation of the handle 82. To facilitate such movement, the frame 88 includes a bore 90 into which the main element 84 is accommodated. The handle is mounted on the beam adjacent to the wheel so that rotation of the handle is translated into linear movement of the jackscrew. A mounting collar, such as collar 92, can be used to effect such mounting.

It is understood that while certain forms of the present invention have been illustrated and described herein, it is not to be limited to the specific forms or arrangements of parts described and shown.

I claim:

1. A support for a boat trailer, the boat trailer including a chassis, wheels connected together and to the chassis by an axle with the axle being located at a first height above a ground surface when the wheels rest on the ground, the support comprising:

(A) elevating means which lifts the wheels above the first height and includes two ramps each having an upwardly inclined entrance section, a downwardly inclined exit section and a horizontal top section connecting said entrance section to said exit section, each of said ramps having a bottom surface and a width which is measured between two sides of the ramp and which is sized to permit a trailer wheel to move onto and off of the ramp, said ramp top surfaces being spaced above the ramp bottoms to be located at a second height above the ground when said ramps are resting on the ground; and (B) a movable dolly-like device which includes
 (1) a frame having two beams, with each beam having a top surface,
 (2) two cross frame elements connecting said beams together,
 (3) an axle-engaging element mounted on top of said beams and extending from one beam to another and having an axle-engaging element top surface and an axle-engaging element forward surface connected to said axle-engaging element top surface,
 (4) wheels mounted beneath said beam surfaces, said beams and said wheels being sized to position said beam top surfaces at a third height above the ground which third height is greater than the first height but which is less than a combined total of the first and said second heights, and said axle-engaging element forward side surface is positioned above said beam top surfaces with the axle-engaging element top surface being located at a fourth height above the ground that is greater than the combined total heights of the first height and said second height so that said axle-engaging element forward side surface engages the trailer axle when the trailer wheels rest on top of said top sections and said beams will support said wheels above the ground when the axle rests on said beam top surfaces.

2. The support defined in claim 1 wherein each of said dolly device wheels includes a pivot means which permits said each wheel to move in at least two planes.

3. The support defined in claim 2 wherein said beams include leaf springs.

4. The support defined in claim 3 further including means on said beams for elevating said dolly-like device.

* * * * *